| United States Patent [19] | [11] Patent Number: 4,895,900 |
| --- | --- |
| Sukejima et al. | [45] Date of Patent: Jan. 23, 1990 |

[54] COATING COMPOSITION

[75] Inventors: Hajime Sukejima, Hiratsuka; Hiroshi Iwai, Atsugi; Kozi Matsumoto, Hiratsuka, all of Japan

[73] Assignee: Kansai Paint Company, Limited, Amagasaki, Japan

[21] Appl. No.: 131,240

[22] Filed: Dec. 7, 1987

Related U.S. Application Data

[62] Division of Ser. No. 23,352, Mar. 9, 1987, abandoned.

[30] Foreign Application Priority Data

Mar. 12, 1986 [JP] Japan .................................. 61-54358
Jan. 23, 1987 [JP] Japan .................................. 62-14626

[51] Int. Cl.$^4$ ...................... C08L 33/02; C08L 33/14; C08L 33/26
[52] U.S. Cl. .................................. 525/108; 525/117; 525/118; 525/119
[58] Field of Search ................ 525/108, 119, 117, 118

[56] References Cited

U.S. PATENT DOCUMENTS

| 3,998,905 | 12/1976 | Labana et al. | 525/108 |
| 4,172,177 | 10/1979 | Sato | 525/119 |
| 4,467,071 | 8/1984 | Dawdy | 525/108 |

FOREIGN PATENT DOCUMENTS

| 3429379 | 2/1985 | Fed. Rep. of Germany | 525/108 |
| 57-70161 | 4/1982 | Japan | 525/108 |
| 60-730656 | 7/1985 | Japan | 525/119 |

*Primary Examiner*—Lewis T. Jacobs
*Assistant Examiner*—Robert E. Lee Sellers, II
*Attorney, Agent, or Firm*—Armstrong, Nikaido, Marmelstein, Kubovcik & Murray

[57] ABSTRACT

This invention provides a coating composition comprising a basic nitrogen-containing acrylic resin, a polyepoxy compound and a carboxyl group-containing acrylic resin.

4 Claims, No Drawings

COATING COMPOSITION

This application is a division of application Ser. No. 023,352 filed Mar. 9, 1987, now abandoned.

The present invention relates to coating compositions. More particularly, the present invention relates to a coating composition capable of providing a film excelling in appearance, physical properties, weather resistance and so on upon ambient temperature cure or low-temperature heat cure.

As coating compositions of this type, there are known the compositions described in Japanese Patent Application Laid-open No. 52-76338 and No. 59-142220, and other literature. These compositions invariably contain a basic nitrogen-containing acrylic resin and a polyepoxy compound.

However, when these known compositions are used to produce a coating film, there inevitably occurs yellowing or browning and, therefore, these compositions are not suitable for commercial use.

It is an object of the present invention to provide a coating composition which is free from the disadvantage of yellowing or browning of coats which would adversely affect the commercial value of the coated products.

It is another object of the present invention to provide a coating composition which, on ambient temperature cure or low-temperature heat cure, yields a film having an attractive finished appearance and excelling in physical properties, weather resistance and so on.

Other objects and advantages of the present invention will become apparent from the detailed description that follows.

In accordance with the present invention, there is provided a coating composition comprising a basic nitrogen-containing acrylic resin, a polyepoxy compound and a carboxyl group-containing acrylic resin.

As the basic nitrogen-containing acrylic resin, there can be used a broad range of known resins such as those described in Japanese Patent Application Laid-open No. 52-76338 and No. 59-142220, for instance.

The basic nitrogen-containing acrylic resin described in Japanese Patent Application Laid-open No. 52-76338 is a resin prepared by mixing and polymerizing the following components (A), (B) and (C) in the ratio of 0.2 to 30 weight percent, 35 to 99.8 weight percent, and 0 to 60 weight percent, respectively.

Component (A)

Acrylic acid derivatives such as dimethylaminoethyl acrylate, diethylaminoethyl acrylate, etc.; methacrylic acid derivatives such as dimethylaminoethyl methacrylate, diethylaminoethyl methacrylate, etc.; acrylamide derivatives such as N-dimethylaminoethylacrylamide, N-diethylaminoethylacrylamide, etc.; and methacrylamide derivatives such as N-dimethylaminoethylmethacrylamide, N-diethylaminoethylmetacrylamide, and so on.

Component (B)

Esters of acrylic acid or methacrylic acid with acyclic or cyclic aliphatic monohydric alcohols such as methanol, ethanol, propanol, butanol, lauryl alcohol, stearyl alcohol, benzyl alcohol, cyclohexanol, and so on.

Component (C)

Monomers copolymerizable with the above-mentioned components (A) and (B), such as styrene, acrylic acid, methacrylic acid, alpha-methylstyrene, vinyltoluene, acrylonitrile, vinyl acetate, 2-hydroxyethyl acrylate, 2-hydroxypropyl acrylate, 2-hydroxyethyl methacrylate, 2-hydroxypropyl methacrylate, ethylacrylamide, ethylmethacrylamide, the corresponding methylol compounds, itaconic acid, glycidyl acrylate, glycidyl methacrylate, 2-vinylpyridine, and so on.

For producing a basic nitrogen-containing acrylic resin by copolymerizing the above-mentioned components (A), (B) and (C), any of the known polymerization methods can be employed. The solution radical polymerization method is particularly preferred, however.

The basic nitrogen-containing acrylic resin described in Japanese Patent Application Laid-open No. 59-142220 is a polymer containing both carboxyl and tertiary amino groups which is obtainable by reacting a vinyl polymer containing both carboxylic anhydride and free carboxyl groups with a compound containing both an active hydrogen group capable of reacting with said carboxylic anhydride group and a tertiary amino group.

The above-mentioned vinyl polymer containing both carboxylic anhydride and free carboxyl groups is a polymer obtainable by copolymerizing an acid anhydride group-containing monomer, a carboxyl group-containing monomer, and one or more other vinyl monomers copolymerizable with said monomers. Examples of said acid anhydride group-containing monomer include maleic anhydride, itaconic anhydride and so on. Examples of said carboxyl group-containing monomer include acrylic acid, methacrylic acid, crotonic acid, itaconic acid, maleic acid, fumaric acid, itaconic acid monoalkyl esters, maleic acid monoalkyl esters, fumaric acid monoalkyl esters, adducts of hydroxyl group-containing vinyl monomers (for example, 2-hydroxyethyl acrylate) with acid anhydrides (for example, succinic anhydride and trimellitic anhydride). The copolymerizable other vinyl monomers mentioned above include, among others, methacrylic acid esters such as methyl metacrylate, ethyl metacrylate, butyl metacrylate, lauryl methacrylate, benzyl methacrylate, cyclohexyl methacrylate, etc.; acrylic acid esters such as methyl acrylate, ethyl acrylate, butyl acrylate, lauryl acrylate, benzyl acrylate, cyclohexyl acrylate, etc.; dialkyl esters of unsaturated dibasic acids such as itaconic acid, maleic acid, fumaric acid, etc.; aromatic unsaturated hydrocarbons such as styrene, alphamethylstyrene, vinyltoluene, etc.; vinyl acetate, acrylonitrile, methacrylonitrile, acrylamide, methacrylamide, diacetoneacrylamide, N,N-dimethylacrylamide, N-vinylpyrrolidone, vinyl chloride, and so on. The proportions of said acid anhydride group-containing monomer and said carboxyl group-containing monomer, which are preferred from the standpoint of cure property, water resistance, alkali resistance, etc.; are 1 to 20 weight percent and 1 to 15 weight percent, respectively. The preferred proportion of said other vinyl monomers copolymerizable with the monomers mentioned just above is 98 to 65 weight percent. For the production of a vinyl polymer containing both carboxylic anhydride and carboxyl groups from these monomers, any of the known ordinary methods can be employed but the solution radical polymerization method is particularly advantageous.

The above-mentioned compound containing an active hydrogen group capable of reacting with the carboxylic anhydride group and a tertiary amino group is a compound containing one or more members selected from the class consisting of hydroxyl group, primary amino group and secondary amino group and a tertiary amino group. Preferred examples of such compound include alcohols each having a tertiary amino group and primary or secondary amines each having a tertiary amino group.

Representative of said alcohols having a tertiary amino group are adducts of secondary amines to epoxy compounds.

The secondary amines mentioned just above include, among others, dimethylamine, diethylamine, dipropylamine, dibutylamine, ethyleneimine, morpholine, piperazine, piperidine, pyrrolidine, and secondary amino group-containing aminoalcohols which are obtainable by addition reaction of a primary amine such as methylamine, ethylamine, butylamine or the like with a mono- to polyepoxy compound.

The epoxy compounds mentioned above include, among others, monoepoxy compounds such as ethylene oxide, propylene oxide, butylene oxide, dodecene oxide, styrene oxide, cyclohexene oxide, butyl glycidyl ether, phenyl glycidyl ether, p-tert-butylbenzoic acid glycidyl ester, Cardura E-10 (a branched fatty acid glycidyl ester manufactured by Shell, the Netherland), etc.; polyepoxy compounds such as polyhydric alcohol polyglycidyl ethers such as ethylene glycol diglycidyl ether, neopentyl glycol diglycidyl ether, 1,6-hexanediol diglycidyl ether, bisphenol A diglycidyl ether, glycerin triglycidyl ether, etc.; polycarboxylic acid polyglycidyl esters such as phthalic acid diglycidyl ester, isophthalic acid diglycidyl ester, adipic acid diglycidyl ester, etc.; various epoxy resins such as bisphenol A diglycidyl ether type epoxy resin, bisphenol F diglycidyl ether type epoxy resin, novolac epoxy resin, hydantoin ring-containing epoxy resin, etc.; p-hydroxybenzoic acid glycidyl ester ether and various vinyl polymers having epoxy groups in the side chain.

Representative examples of the tertiary amino group-containing alcohol which is obtainable by reacting such a secondary amine with such an epoxy compound as mentioned above include dimethylaminoethanol, diethylaminoethanol, di-n-propylaminoethanol, diisopropylaminoethanol, di-n-butylaminoethanol, N-(2-hydroxyethyl)morpholine, N-(2-hydroxyethyl)piperidine, N-(2-hydroxyethyl)pyrrolidine, N-(2-hydroxyethyl)aziridine, N,N-dimethyl-2-hydroxypropylamine, N,N-diethyl-2-hydroxypropylamine, triethanolamine, tripropanolamine and so on. Further among said tertiary amino group-containing alcohols are adducts of aminoalcohols (for example, ethanolamine, propanolamine, etc.) to tertiary amino group-containing acrylate or methacrylate monomers (for example, dimethylaminoethyl acrylate, dimethylaminoethyl methacrylate, diethylaminoethyl acrylate, diethylaminoethyl methacrylate, etc.) and copolymers of said tertiary amino group-containing acrylate or methacrylate monomers with hydroxyl group-containing monomers (for example, beta-hydroxyethyl acrylate, betahydroxyethyl methacrylate, etc.).

Representative examples of said tertiary amino group-containing primary and secondary amines include N,N-dialkyl-1,3-propylenediamines such as N,N-dimethyl-1,3-propylenediamine, N,N-diethyl-1,3-propylenediamine, etc.; N-alkylpiperazines such as N-methylpiperazine, N-ethylpiperazine, etc.; and adducts of said tertiary amino group-containing acrylate or methacrylate monomers to ethylenediamine, propylenediamine, hexamethylenediamine, piperazine, methylamine, ethylamine, butylamine, ammonia and so on.

From the standpoint of curing property, dialkylaminoethanols and N,N-dialkyl-1,3-propylenediamines are particularly desirable.

In reacting a vinyl polymer containing both a carboxylic anhydride group and a carboxyl group with such a compound containing both an active hydrogen group and a tertiary amino group, the two starting materials are mixed in such proportions that the ratio of said active hydrogen group to said acid anhydride group is about 0.5 to about 3 equivalents and the mixture is reacted at room temperature to about 120° C. The basic nitrogen-containing acrylic resin for use in the present invention is thus produced.

As the polyepoxy compound to be incorporated in the composition according to the present invention, any known compound or resin that contains two or more epoxy groups per molecule can be employed. As preferred examples of said compound containing two or more epoxy groups per molecule, polyhydric alcohol glycidyl ethers can be mentioned. To be specific, ethylene glycol diglycidyl ether, 1,6-hexanediol diglycidyl ether, neopentyl glycol diglycidyl ether, glycerin polyglycidyl ether, pentaerythritol polyglycidyl ether, sorbitol polyglycidyl ether, etc. may be mentioned. As preferred examples of said resin containing two or more epoxy groups per molecule, there may be mentioned those acrylic resins which can be prepared by copolymerizing glycidyl acrylate or glycidyl methacrylate with an acrylic acid ester (such as methyl acrylate, ethyl acrylate, etc.), a methacrylic acid ester (such as methyl methacrylate, ethyl methacrylate, etc.), styrene, vinyl acetate, vinyl chloride or the like. In accordance with the present invention, these polyepoxy compounds are used singly or in combination.

The carboxyl group-containing acrylic resin to be incorporated in the composition according to the present invention may be any known acrylic resin containing carboxyl groups. To be specific, there may be mentioned acrylic resins which can be obtained by copolymerizing 0.5 to 20 weight percent of a carboxyl group-containing functional vinyl monomer with 99.5 to 80 weight percent of a copolymerizable other vinyl monomer.

Such acrylic resins may be further described in detail. Preferred examples of said carboxyl group-containing functional vinyl monomer include $C_{3-6}$ unsaturated aliphatic or dibasic acids, such as acrylic acid, methacrylic acid, vinyl acetate, itaconic acid, crotonic acid, maleic acid, maleic anhydride, fumaric acid, citraconic acid, mesaconic acid and so on.

Examples of said copolymerizable other vinyl monomer include the compounds which contain 1 to 2, preferably only one, radically polymerizable alpha,beta-ethylenic unsaturation. For example, one or more of the following compounds can be selectively employed.

(a) Aromatic vinyl compounds such as styrene, vinyltoluene, alpha-methylstyrene, etc. and other vinyl monomers such as vinyl acetate, acrylonitrile, methacrylonitrile and so on.

(b) $C_{1-24}$ alkyl or cycloalkyl esters of acrylic or methacrylic acid, such as methyl acrylate, methyl methacrylate, ethyl acrylate, ethyl methacrylate, n-butyl acrylate, n-butyl methacrylate, isobutyl acrylate, isobutyl methacrylate, tert-butyl acrylate, tert-butyl methacrylate, cyclohexyl acrylate, cyclohexyl methacrylate, 2-ethylhexyl acrylate, 2-ethylhexyl methacrylate, lauryl acrylate, lauryl methacrylate, stearyl acrylate, stearyl methacrylate and so on.

(c) Hydroxy-$C_{1-24}$-alkyl esters of acrylic or methacrylic acid, such as 2-hydroxyethyl acrylate, 2-hydroxyethyl methacrylate, 3-hydroxypropyl acrylate, 3-hydroxypropyl methacrylate and so on.

Particularly preferred, among the copolymerizable vinyl monomers mentioned above, are styrene, $C_{1-5}$ alkyl esters of acrylic or methacrylic acid, such as methyl acrylate, methyl methacrylate, ethyl acrylate, ethyl methacrylate, n-butyl acrylate, n-butyl methacrylate, etc., 2-hydroxyethyl acrylate and so on.

Regarding the proportions of said carboxyl group-containing functional monomer and said copolymerizable vinyl monomer, it is preferable to mix them in such proportions that said carboxyl group-containing functional monomer accounts for about 0.5 to about 20 weight percent, preferably about 1 to about 15 weight percent, of the total monomer. If the proportion of said carboxyl group-containing functional monomer in the total monomer is less than 0.5 weight percent, the effect of discoloration inhibition is not fully exploited. On the other hand, if the proportion of said carboxyl group-containing monomer exceeds 20 weight percent, the compatibility between the resins deteriorate. Thus, both cases are undesirable.

The copolymerization reaction between said carboxyl group-containing functional monomer and said copolymerizable vinyl monomer can be advantageously conducted by the solution polymerization method in the presence of a radical polymerization initiator. As examples of the solvent that can be employed for this solution polymerization, there may be mentioned benzene; alkylbenzene derivatives such as toluene, xylene, etc.; alcohol solvents such as n-butanol, isobutyl alcohol, etc.; acetic acid ester solvents such as butyl acetate, ethyl acetate, cellosolve acetate, etc., ether solvents such as butyl-cellosolve, etc., and ketone solvents such as acetone, methyl ethyl ketone and so on. These solvents can be used either singly or in combination. As to the radical polymerization initiator, not only azo type polymerization initiators such as azobisisobutyronitrile but also organic peroxides such as peroxide polymerization initiators, e.g. benzoyl peroxide, lauroyl peroxide, dicumyl peroxide, etc. and hydroperoxide polymerization initiators, e.g. tert-butyl hydroperoxide, cumene hydroperoxide, etc. may be mentioned. Aside from them, ketone peroxide and perester type polymerization initiators can also be employed. These polymerization initiators are added either singly or in combination to the polymerization reaction system. The polymerization temperature may be generally in the range of about 50° to about 200° C., preferably about 80° to about 150° C.

The molecular weight of the carboxyl group-containing acrylic resin thus obtained is generally about 8,000 to about 50,000, preferably about 10,000 to about 30,000 in terms of weight average molecular weight. If the molecular weight of said acrylic resin is too small, the physical properties of the resulting film tend to be adversely affected. Conversely, if the molecular weight of said acrylic resin is too high, the finished appearance of the resulting film deteriorates. Thus, both cases are unsatisfactory.

The relative amounts of said basic nitrogen-containing acrylic resin and said polyepoxy compound in the composition according to the present invention are preferably such that the proportion of epoxy groups in the polyepoxy compound is about 0.5 to about 2 equivalents per equivalent of carboxyl and amino groups combined in the basic nitrogen-containing acrylic resin. If the epoxy content is less than 0.5 equivalent, the cure property of the film is not satisfactory, with gasoline resistance and physical properties tending to deteriorate. If the proportion of epoxy groups is in excess of 2 equivalents, the initial drying property of the composition tends to become deteriorated, with the film being liable to discolor. As regards the amount of said carboxyl group-containing acrylic resin to be incorporated in the composition of the present invention, it is generally about 2 to about 40 weight parts and preferably about 5 to about 30 weight parts (on a nonvolatile matter basis) per 100 weight parts of said basic nitrogen-containing acrylic resin (on a nonvolatile matter basis). If the proportion of said carboxyl group-containing acrylic resin is less than 2 weight parts, there occur cases in which the object of discoloration inhibition according to the invention cannot be accomplished. If, conversely, the proportion of said carboxyl group-containing acrylic resin exceeds 40 weight parts, the reactivity of the resulting composition and the physical properties of the film tend to become deteriorated. Thus, both cases are undesirable.

In the practice of the present invention, a phosphorus-containing compound is preferably incorporated in the coating composition. The addition of such a phosphorus-containing compound results in an enhancement of the expected effects of the present invention, especially the inhibitory effect on discoloration. As to the types of phosphorus-containing compound which can be employed in the present invention, any of the known phosphorus-containing compounds and resins can be employed. Thus, for example, inorganic acids such as phosphoric acid, phosphorous acid, etc.; orthophosphoric acid esters such as trimethyl phosphate, triethyl phosphate, tributyl phosphate, trioctyl phosphate, tributoxyethyl phosphate, tris(chloroethyl) phosphate, tris(dichloropropyl) phosphate, triphenyl phosphate, tricresyl phosphate, trixylenyl phosphate, cresyl diphenyl phosphate, octyl diphenyl phosphate, xylenyl diphenyl phosphate, trilauryl phosphate, tricetyl phosphate, tristearyl phosphate, trioleyl phosphate and so on; phosphorous acid esters such as triphenyl phosphite, tris(tridecyl) phosphite, dibutyl hydrogen phosphite, etc; phosphonic acid esters such as dibutyl butylphosphonate, bis(2-ethylhexyl) 2-ethylhexylphosphonate, 2-ethylhexylphosphonic acid mono(2-ethylhexyl) ester, etc.; acid phosphoric acid esters such as methyl hydrogen phosphate, isopropyl hydrogen phosphate, butyl hydrogen phosphate, dibutyl phosphate, triethyl phosphate, trilauryl phosphate, monobutyl phosphate, octyl hydrogen phosphate, dioctyl phosphate, isodecyl hydrogen phosphate, monoisodecyl phosphate, tridecanol hydrogen phosphate, etc.; the corresponding polyphosphoric acid compounds; phosphoric acid-copolymerized acrylic resins and so on may be mentioned. Among these compounds, phosphoric acid, triphenyl phosphate, methyl hydrogen phosphate, dibutyl phosphate and polyphosphoric acid compounds are particularly suitable. In the practice of the present invention, these phosphorus-containing compounds are used either singly or in combination.

The amount of such phosphorus-containing compound in the composition according to the present invention is generally not more than about 20 weight parts, preferably about 1 to about 10 weight parts, per 100 weight parts (nonvolatile matter) of said basic nitrogen-containing acrylic resin. If the proportion of the phosphorus-containing compound exceeds 20 weight parts, the reactivity of the resulting composition and the physical properties of the film tend to become deteriorated.

In the composition according to the present invention, there may be further incorporated colorizing pigments, metallic pigments, extender pigments and so on. The colorizing pigment include titanium oxide, red iron oxide, carbon black, phthalocyanine blue, etc.; said metallic pigments include aluminum powder, pearl mica powder, etc.; and said extender pigments include talc, clay, mica and so on. While there is no particular limitation on the proportion of such pigments, it is generally preferable that they be used in a proportion of up to about 300 weight parts per 100 weight parts of the nonvolative matter of the resin.

If necessary, there may be incorporated in the composition of the present invention such other additives as various solvents, e.g. aromatic solvents such as toluene, xylene, etc., ketone solvents such as methyl ethyl ketone, methyl isobutyl ketone, cyclohexanone, etc. and alcohol solvents such as methyl alcohol, butyl alcohol, etc., surface conditioning agents, pigment dispersing agents, anti-sagging agents, ultraviolet absorbers and so on in suitable amounts.

The composition according to the present invention can be prepared by a variety of known techniques. For example, the basic nitrogen-containing acrylic resin and carboxyl group-containing acrylic resin, as well as said phosphorus-containing compound if necessary, are first mixed together, followed by addition of the polyepoxy compound and mixing.

In using the composition according to the present invention, the substrate material is coated with the composition by the conventional technique and the coated surface is let dry at ambient temperature or dried by heating at a moderate temperature up to about 80° C. The type of substrate material is virtually optional; thus metals, plastics, woods, organic films or layers and so on may be mentioned. In this way, a cured film is formed on the substrate surface.

The composition according to the present invention gives, on cold cure or on curing at a low temperature, gives a film which excells in finished appearance, physical properties, weather resistance and other characteristics. Furthermore, the composition according to the present invention is free from the yellowing or browning of the film so that it does not detract from the market value of coated products, being thus of great practical use.

The following production example comparison examples are further illustrative of the present invention. In the following description, all "parts" are by weight and all "percents(%)" are by weight.

PRODUCTION EXAMPLE (Production of carboxyl group-containing acrylic resin)

A reactor equipped with a thermometer, stirrer, reflux condenser and drip funnel was charged with 80 parts of toluol and heated to 100° C. At this temperature, the following vinyl monomers-polymerization initiator mixture was added dropwise over 30 minutes.

| | |
|---|---|
| Acrylic acid | 1 part |
| Styrene | 20 parts |
| Methyl methacrylate | 30 parts |
| Ethyl acrylate | 40 parts |
| 2-Hydroxyethyl methacrylate | 9 parts |
| Xylol | 20 parts |
| Azobisisobutyronitrile | 2 parts |
| Total | 122 parts |

Thirty minutes after completion of the dropwise addition, 0.5 part of azobisisobutyronitrile was further added and the reaction was continued in a nitrogen stream at 100° C. for 2 hours to give a carboxyl group-containing acrylic resin solution A with a nonvolative matter content of 50% and a weight average molecular weight of 16,000.

The above procedure was repeated except that the monomer compositions indicated below in Table 1 were used to give carboxyl group-containing acrylic resin solutions B to E each having a nonvolatile matter content of 50%.

TABLE 1

| | Resin solution | | | | |
|---|---|---|---|---|---|
| | A | B | C | D | E |
| (Monomer composition) | | | | | |
| Acrylic acid | 1 | 5 | 10 | 15 | |
| Methacrylic acid | | | | | 5 |
| Styrene | 20 | 20 | 20 | 20 | 20 |
| Methyl methacrylate | 30 | 30 | 30 | 30 | 30 |
| Ethyl acrylate | 40 | 36 | 35 | 33 | 38 |
| 2-Hydroxyethyl methacrylate | 9 | 9 | 5 | 2 | 7 |
| Total | 100 | 100 | 100 | 100 | 100 |
| Nonvolatile matter (%) | 50 | 50 | 50 | 50 | 50 |
| Weight average molecular weight | 16000 | 20000 | 13000 | 16000 | 20000 |

EXAMPLE 1

To 100 parts of Coatax LK-708 (basic nitrogen-containing acrylic resin, nonvolatile matter 55%, Toray Industries, Inc.) was added 20 parts of carboxyl group-containing acrylic resin solution A, followed by addition of 4.2 parts of sorbitol polyglycidyl ether (polyepoxy compound, epoxy equivalent 170, Nagase Kasei Kogyo K.K.). The materials were mixed to give a clear composition of the present invention.

EXAMPLES 2 TO 5

The procedure of Example 1 was repeated except that the carboxyl group-containing acrylic resin solutions shown below in Table 2 were respectively used in lieu of carboxyl group-containing acrylic resin solution A to give clear compositions of the present invention.

EXAMPLE 6

To 100 parts of Acrydic A-910 (basic nitrogen-containing acrylic resin, nonvolatile matter 50%, Dainippon Ink and Chemicals, Inc.) was added 25 parts of carboxyl group-containing acrylic resin solution A, followed by addition of 6.2 parts of sorbitol polyglycidyl ether (polyepoxy compound, epoxy equivalent 170, Nagase Kasei Kogyo K.K.). The materials were mixed to give a clear composition of the present invention.

EXAMPLES 7 TO 10

The procedure of Example 6 was repeated except that the carboxyl group-containing acrylic resin solutions shown below in Table 2 were respectively used in lieu of carboxyl group-containing acrylic resin solution A to give clear compositions of the present invention.

EXAMPLE 11

To 42 parts of Acrydic A-910 and 80 parts of titanium white JR603 (Teikoku Kako Co., Ltd.) were added 6 parts of toluol, 6 parts of xylol and 6 parts of methyl ethyl ketone and the mixture was dispersed in a paint shaker (Red Devil) for 30 minutes. To this dispersed base were further added 158 parts of Acrydic A-910, 15 parts of toluol, 15 parts of xylol and 12 parts of methyl ethyl ketone to give a white coating base.

To 100 parts of the white coating base thus prepared were added 6.0 parts of carboxyl group-containing acrylic resin solution B and 3.6 parts of sorbitol polyglycidyl ether (polyepoxy compound, epoxy equivalent 170, Nagase Kasei Kogyo K.K.) to give a white coating composition of the present invention.

COMPARISON EXAMPLE 1

The procedure of Example 1 was repeated except that carboxyl group-containing acrylic resin solution A was omitted to give a clear composition.

COMPARISON EXAMPLE 2

The procedure of Example 6 was repeated except that carboxyl group-containing acrylic resin solution A was omitted to give a clear composition.

COMPARISON EXAMPLE 3

The procedure of Example 11 was repeated except that carboxylic group-containing acrylic resin solution B was omitted to give a white coating composition.

Using a 300 μ doctor blade, the compositions obtained in Examples 1 to 11 and Comparison Examples 1 to 3 were respectively coated on films of a white CAB-modified acrylic laquer (Acrylic No. 2000GL, Kansai Paint Co., Ltd.) and either after 10 days drying at room temperature or after one hour drying at 70° C., the resulting films were examined for discoloration. Further, using a 300 μ doctor blade, the compositions obtained in Examples 1 to 11 and Comparison Examples 1 to 3 were respectively coated on mild steel specimens and after 4 days drying at room temperature, the coated surface was examined for gasoline resistance (20 rubbings) and pencil hardness.

The results are shown in Table 2.

TABLE 2

| | | Example 1 | Example 2 | Example 3 | Example 4 | Example 5 |
|---|---|---|---|---|---|---|
| Coatex LK-708 | | 100 | 100 | 100 | 100 | 100 |
| Acrydic A-910 | | | | | | |
| Polyglycidyl ether | | 4.2 | 4.2 | 4.2 | 4.2 | 4.2 |
| Carboxyl group- | A | 20 | | | | |
| containing | B | | 20 | | | |
| acrylic resin | C | | | 15 | | |
| solution | D | | | | 10 | |
| | E | | | | | 10 |
| Titanium white JR-603 | | | | | | |
| Toluol | | | | | | |
| Xylol | | | | | | |
| Methyl ethyl ketone | | | | | | |
| Coloration of coated surface | After 1 hour at 70° C. | Not discolored | Not discolored | Not discolored | Not discolored | Not discolored |
| | After 10 days at room temperature | Not discolored | Not discolored | Not discolored | Not discolored | Not discolored |
| Gasoline resistance | | Good | Good | Good | Good | Good |
| Pencil hardness | | F | F | F | F | F |

| | | Example 6 | Example 7 | Example 8 | Example 9 | Example 10 |
|---|---|---|---|---|---|---|
| Coatax LK-708 | | | | | | |
| Acrydic A-910 | | 100 | 100 | 100 | 100 | 100 |
| Polyglycidyl ether | | 6.2 | 6.2 | 6.2 | 6.2 | 6.2 |
| Carboxyl group- | A | 25 | | | | |
| containing | B | | 20 | | | |
| acrylic resin | C | | | 15 | | |
| solution | D | | | | 10 | |
| | E | | | | | 10 |
| Titanium white JR-603 | | | | | | |
| Toluol | | | | | | |
| Xylol | | | | | | |
| Methyl ethyl ketone | | | | | | |
| Coloration of coated surface | After 1 hour at 70° C. | Not discolored | Not discolored | Not discolored | Not discolored | Not discolored |
| | After 10 days at room temperature | Not discolored | Not discolored | Not discolored | Not discolored | Not discolored |
| Gasoline resistance | | Good | Good | Good | Good | Good |
| Pencil hardness | | F | F | F | F | F |

| | Example 11 | Comparison Example 1 | Comparison Example 2 | Comparison Example 3 |
|---|---|---|---|---|
| Coatex LK-708 | | 100 | | |

TABLE 2-continued

| | | | | | |
|---|---|---|---|---|---|
| Acrydic A-910 | | 200 | | 100 | 200 |
| Polyglycidyl ether | | 12.4 | 4.2 | 6.2 | 12.4 |
| Carboxyl group- | A | | | | |
| containing | B | 20.4 | | | |
| acrylic resin | C | | | | |
| solution | D | | | | |
| | E | | | | |
| Titanium white JR-603 | | 80 | | | 80 |
| Toluol | | 21 | | | 21 |
| Xylol | | 21 | | | 21 |
| Methyl ethyl ketone | | 18 | | | 18 |
| Coloration of coated surface | After 1 hour at 70° C. | Not discolored | Markedly discolored | Markedly discolored | Discolored |
| | After 10 days at room temperature | Not discolored | Discolored | Discolored | Discolored |
| Gasoline resistance | | Good | Good | Good | Good |
| Pencil hardness | | H | F | F | H |

EXAMPLE 12

To 100 parts of Coatax LK-708 (basic nitrogen-containing acrylic resin, nonvolatile matter 55%, Toray Industries, Inc.) were added 20 parts of carboxyl group-containing acrylic resin solution A and 3 parts of triethyl phosphate, followed by addition of 4.2 parts of sorbitol polyglycidyl ether (polyepoxy compound, epoxy equivalent 170, Nagase Kasei Kogyo K.K.). The materials were mixed to give a clear composition according to the present invention.

EXAMPLES 13 TO 16

The procedure of Example 12 was repeated except that the carboxyl group-containing acrylic resin solutions shown below in Table 3 were respectively used in lieu of carboxyl group-containing acrylic resin solution A to give clear compositions according to the present invention.

EXAMPLE 17

To 100 parts of Acrydic A-910 (basic nitrogen-containing acrylic resin, nonvolatile matter 50%, Dainippon Ink and Chemicals, Inc.) were added 20 parts of carboxyl group-containing acrylic resin solution A and 3 parts of dibutyl phosphate, followed by addition of 6.2 parts of sorbitol polyglycidyl ether (polyepoxy compound, epoxy equivalent 170, Nagase Kasei Kogyo K.K.). The materials were mixed to give a clear composition according to the present invention.

EXAMPLES 18 TO 21

The procedure of Example 17 was repeated except that the carboxyl group-containing acrylic resin solutions shown below in Table 3 were respectively used in lieu of carboxyl group-containing acrylic resin solution A to give clear compositions according to the present invention.

EXAMPLES 22 TO 24

The procedure of Example 17 was repeated except that the phosphorus-containing compounds shown below in Table 3 were respectively used in lieu of triethyl phosphate to give clear compositions according to the present invention.

EXAMPLE 25

To 42 parts of Acrydic A-910 and 80 parts of titanium white JR603 (Teikoku Kako Co., Ltd.) were added 6 parts of toluol, 6 parts of xylol and 6 parts of methyl ethyl ketone and the mixture was dispersed in a paint shaker (Red Devil) for 30 minutes. To this dispersed base were further added 158 parts of Acrydic A-910, 15 parts of toluol, 15 parts of xylol and 12 parts of methyl ethyl ketone to give a white coating base.

To 100 parts of the above white base were added 6.0 parts of carboxyl group-containing acrylic resin solution B, 2 parts of triethyl phosphate and 3.6 parts of sorbitol polyglycidyl ether (polyepoxy compound, epoxy equivalent 170, Nagase Kasei Kogyo K.K.) to give a white coating composition according to the present invention.

Using a 300 $\mu$ doctor blade, the compositions obtained in Examples 12 to 25 were respectively coated on films of a white CAB-modified acrylic lacquer (Acrylic No. 2000GL, Kansai Paint Co., Ltd.) and either after 30 days drying at room temperature or after 1 hour drying at 100° C., the resulting films were examined for discoloration.

Further, using a 300 $\mu$ doctor blade, the compositions obtained in Examples 12 to 25 were respectively coated on mild steel testpieces and dried at room temperature for 4 days. Then, each coated layer was investigated for gasoline resistance (20 rubbings) and pencil hardness.

The results are shown in Table 3.

TABLE 3

| | | Example | | | | |
|---|---|---|---|---|---|---|
| | | 12 | 13 | 14 | 15 | 16 |
| Coatax LK-708 | | 100 | 100 | 100 | 100 | 100 |
| Acrydic A-910 | | | | | | |
| Polyglycidyl ether | | 4.2 | 4.2 | 4.2 | 4.2 | 4.2 |
| Carboxyl group- | A | 20 | | | | |
| containing | B | | 15 | | | |
| acrylic resin | C | | | 15 | | |
| solution | D | | | | 7 | |
| | E | | | | | 10 |
| Triethyl phosphate | | 3 | 3 | 3 | 3 | 3 |
| Dibutyl phosphate | | | | | | |
| Trilauryl phosphate | | | | | | |

TABLE 3-continued

| | | | | Example | | |
|---|---|---|---|---|---|---|
| | | | | | | |
| Triphenyl phosphate | | | | | | |
| Coloration of coated surface | After 1 hour at 100° C. | Not discolored | Not discolored | Not discolored | Not discolored | Not discolored |
| | After 30 days at room temperature | Not discolored | Not discolored | Not discolored | Not discolored | Not discolored |
| Gasoline resistance | | Good | Good | Good | Good | Good |
| Pencil hardness | | F | F | F | F | F |

| | | Example | | | | |
|---|---|---|---|---|---|---|
| | | 17 | 18 | 19 | 20 | 21 |
| Coatex LK-708 | | | | | | |
| Acrydic A-910 | | 100 | 100 | 100 | 100 | 100 |
| Polyglycidyl ether | | 6.2 | 6.2 | 6.2 | 6.2 | 6.2 |
| Carboxyl group- | A | 20 | | | | |
| containing | B | | 20 | | | |
| acrylic resin | C | | | 10 | | |
| solution | D | | | | 10 | |
| | E | | | | | 15 |
| Triethyl phosphate | | | | | | |
| Dibutyl phosphate | | 3 | 3 | 3 | 3 | 3 |
| Trilauryl phosphate | | | | | | |
| Triphenyl phosphate | | | | | | |
| Coloration of coated surface | After 1 hour at 100° C. | Not discolored | Not discolored | Not discolored | Not discolored | Not discolored |
| | After 30 days at room temperature | Not discolored | Not discolored | Not discolored | Not discolored | Not discolored |
| Gasoline resistance | | Good | Good | Good | Good | Good |
| Pencil hardness | | F | F | F | F | F |

| | | | Example | | |
|---|---|---|---|---|---|
| | | | 22 | 23 | 24 |
| Coatax LK-708 | | | 100 | 100 | 100 |
| Acrydic A-910 | | | | | |
| Polyglycidyl ether | | | 4.2 | 4.2 | 4.2 |
| Carboxyl group- | | A | 15 | 15 | 15 |
| containing | | B | | | |
| acrylic resin | | C | | | |
| solution | | D | | | |
| | | E | | | |
| Triethyl phosphate | | | | | |
| Dibutyl phosphate | | | | | 2 |
| Trilauryl phosphate | | | 4 | | |
| Triphenyl phosphate | | | | 5 | |
| Coloration of coated surface | After 1 hour at 100° C. | | Not discolored | Not discolored | Not discolored |
| | After 30 days at room temperature | | Not discolored | Not discolored | Not discolored |
| Gasoline resistance | | | Good | Good | Good |
| Pencil hardness | | | HB | HB | B |

| | | Example 25 |
|---|---|---|
| Coatax LK-708 | | 200 |
| Acrydic A-910 | | |
| Polyglycidyl ether | | 12.4 |
| Carboxyl group-containing Acrylic resin solution A | | 20.4 |
| Triethyl phosphate | | 6.8 |
| Titanium white JR-603 | | 80 |
| Toluol | | 21 |
| Xylol | | 21 |
| Methyl ethyl ketone | | 18 |
| Coloration of coated surface | After 1 hour at 100° C. | Not discolored |
| | After 30 days at room temperature | Not discolored |
| Gasoline resistance | | Good |
| Pencil hardness | | H |

What is claimed is:

1. A coating composition comprising a first acrylic resin, a second acrylic resin, a polyepoxy compound and a phosphorus-containing compound,
said first acrylic resin being a basic tertiary amino group-containing acrylic resin, said second acrylic resin being a carboxyl group-containing acrylic resin obtained by copolymerizing 0.5 to 20% by weight of a $C_3$–$C_6$ unsaturated aliphatic monobasic or dibasic acid with 99.5 to 80% by weight of at least one copolymerizable other vinyl monomer selected from the group consisting of $C_1$–$C_{24}$ alkyl or cycloalkyl esters of acrylic or methacrylic acid, hydroxy-$C_1$–$C_{24}$ alkyl esters of acrylic or methacrylic acid, aromatic vinyl compound, vinyl acetate, acrylonitrile and methacrylonitrile, said phosphorus-containing compound being selected from the group consisting of phosphorus-containing inorganic acids, orthophosphoric acid esters, phosphorus acid esters, phosphonic acid esters, acid phosphoric acid esters and polyphosphoric acid compounds, the relative amounts of said first acrylic resin and said polyepoxy compound being such that the proportion of epoxy groups in the polyepoxy compound is about 0.5 to about 2 equivalents per equivalent of the combined amount of carboxyl and tertiary amino group in the first acrylic resin, the amount of the second acrylic resin being about 2 to 40 parts by weight calculated as nonvolatile matter per 100 parts by weight of the first acrylic resin calculated as nonvolatile matter, and the amount of the phosphorus-containing compound being about 1 to about 10 parts by weight per 100 parts by weight of the first acrylic resin calculated as nonvolatile matter.

2. A coating composition according to claim 1 wherein said carboxyl group-containing acrylic resin has a weight average molecular weight in the range of about 8,000 to about 50,000.

3. A coating composition according to claim 1 wherein said carboxyl group-containing acrylic resin has a weight average molecular weight in the range of about 10,000 to about 30,000.

4. A coating composition according to claim 1 wherein said polyepoxy compound is a sorbitol polyglycidyl ether.

* * * * *